United States Patent [19]

Quick

[11] 4,121,778
[45] Oct. 24, 1978

[54] HARVESTER FOR SUGAR CANE

[75] Inventor: Donald J. Quick, Bundaberg, Australia

[73] Assignee: Massey-Ferguson Services N.V., Curacao, Netherlands Antilles

[21] Appl. No.: 758,104

[22] Filed: Jan. 10, 1977

[30] Foreign Application Priority Data

Jan. 17, 1976 [GB] United Kingdom ............... 01843/76

[51] Int. Cl.² .............................................. B02C 23/10
[52] U.S. Cl. ...................... 241/79; 56/16.5; 209/139 R
[58] Field of Search ....................... 241/79, 79.1, 79.2, 241/79.3; 56/16.5; 209/138, 139 R, 140, 141

[56] References Cited

U.S. PATENT DOCUMENTS

| 1,888,372 | 11/1932 | Bramwell | 209/139 R |
|---|---|---|---|
| 3,164,548 | 1/1965 | Rowoll et al. | 209/139 R |
| 3,512,564 | 5/1970 | Kerhan | 241/79 |
| 3,655,043 | 4/1972 | Wochnowski et al. | 209/138 |
| 3,873,033 | 3/1975 | Tilby | 241/79 |
| 3,962,072 | 6/1976 | Ramacher et al. | 209/140 |

Primary Examiner—Granville Y. Custer, Jr.
Attorney, Agent, or Firm—Robert L. Farris

[57] ABSTRACT

Air intake for trash removal apparatus of a cane harvester. The air intake forms the lower portion of the housing of the trash removal apparatus and also serves to guide cane billets into the hopper of a pivotally-mounted billet discharge conveyor. The air intake is formed as a deflectible air permeable curtain of perforated rubber sheeting which avoids both damage to the air intake and jamming of the conveyor during use.

12 Claims, 4 Drawing Figures

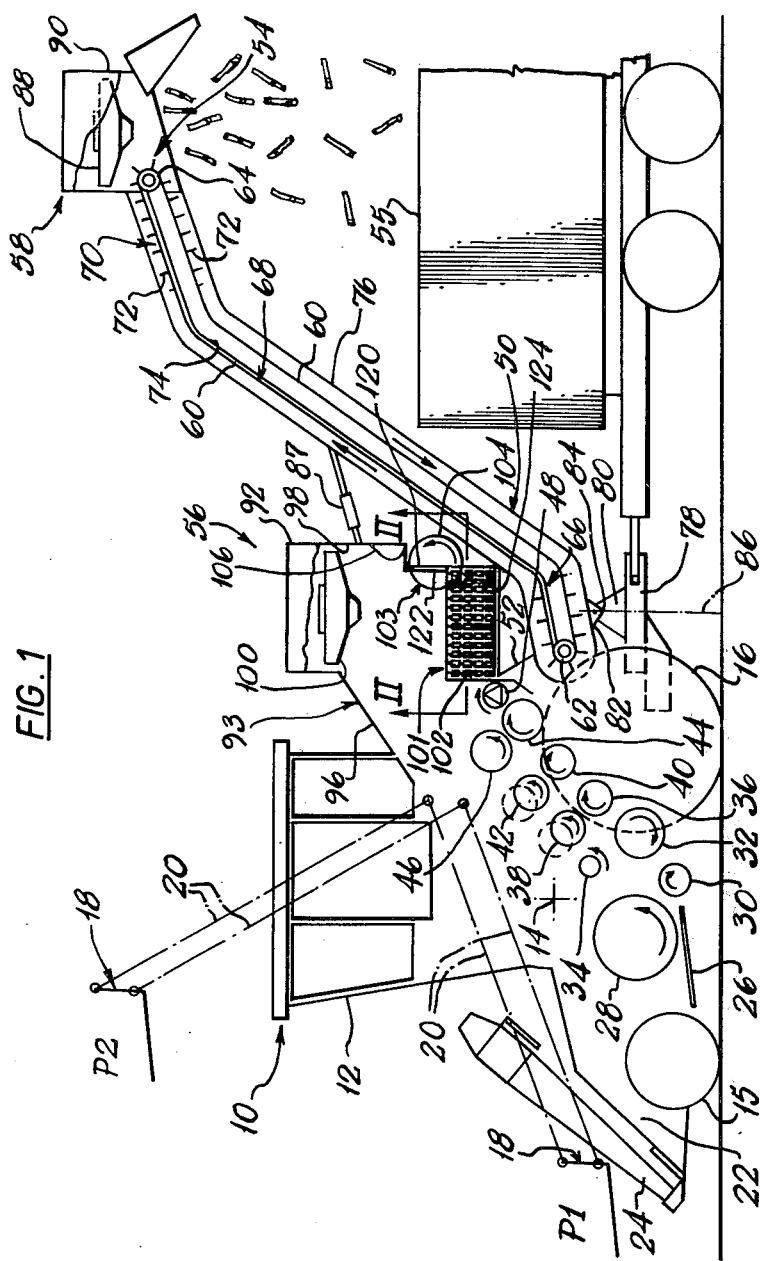

HARVESTER FOR SUGAR CANE

This invention relates to a harvester for sugar cane and similar crops and in particular to an air intake for admitting air to trash removal apparatus in such a harvester.

In a published sugar cane harvester design, cane sticks are chopped into billets and trash removal apparatus passes a stream of air through the billets to entrain cane leaves and other lightweight trash and remove this trash from the billets. After the removal of the trash the billets are deposited on a discharge elevator conveyor which carries the billets to a height from which they can be conveniently dropped into a transport vehicle.

The lower part of the trash removal apparatus serves two functions. Firstly, it guides the billets so that they are deposited on the discharge elevator conveyor and do not fall to the side of it and become lost. Secondly it forms an air intake admitting to the trash removal apparatus air at the very high rate of flow needed by that apparatus to remove trash.

In order to perform its first function adequately, the air-admitting lower part of the trash removal apparatus should preferably be positioned so as to closely overlie the bottom of the discharge elevator. However, the lower part of the discharge elevator is frequently used as a temporary storage zone for cane billets. This facility is made use of when, for any of various possible reasons, it is not possible to discharge the cane billets into a transport vehicle while harvesting proceeds temporarily. During such periods, the drive to the discharge elevator is disengaged and billets build up at the bottom of the elevator. When a transport vehicle once again comes alongside the harvester and it is possible to discharge the billets, the drive to the elevator is re-engaged and a large mass of billets tends to be moved outwards by the elevator. This mass of billets can become jammed against the air-admitting lower part of the trash removal apparatus, and it is an object of this invention to provide an air intake structure which overcomes or mitigates this problem.

According to the invention there is provided a harvester for sugar cane or similar crop comprising:
 stick cutting means operative to cut harvested crop sticks into two or more pieces;
 trash removal apparatus operative to pass air through said stick pieces produced by the stick cutting means and to cause trash to become entrained with the air;
 structure defining an air intake for said trash removal apparatus; and
 a conveyor located adjacent said air intake to receive said stick pieces from the trash removal apparatus;
 characterized in that said structure defining an air intake comprises a deflectible air-permeable curtain positioned to guide said stick pieces towards the conveyor.

The provision of an air intake comprising a deflectible air-permeable curtain positioned to guide the cane stick pieces or billets towards the conveyor allows the mass of billets produced in the manner described above to be removed by the elevator, by deflecting the curtain temporarily.

An embodiment of the invention will now be described by way of example with reference to the accompanying drawings in which:

FIG. 1 shows in side elevation and somewhat diagrammatically a sugar cane harvester including trash removal apparatus with certain internal crop handling components also indicated;

Figure 3:
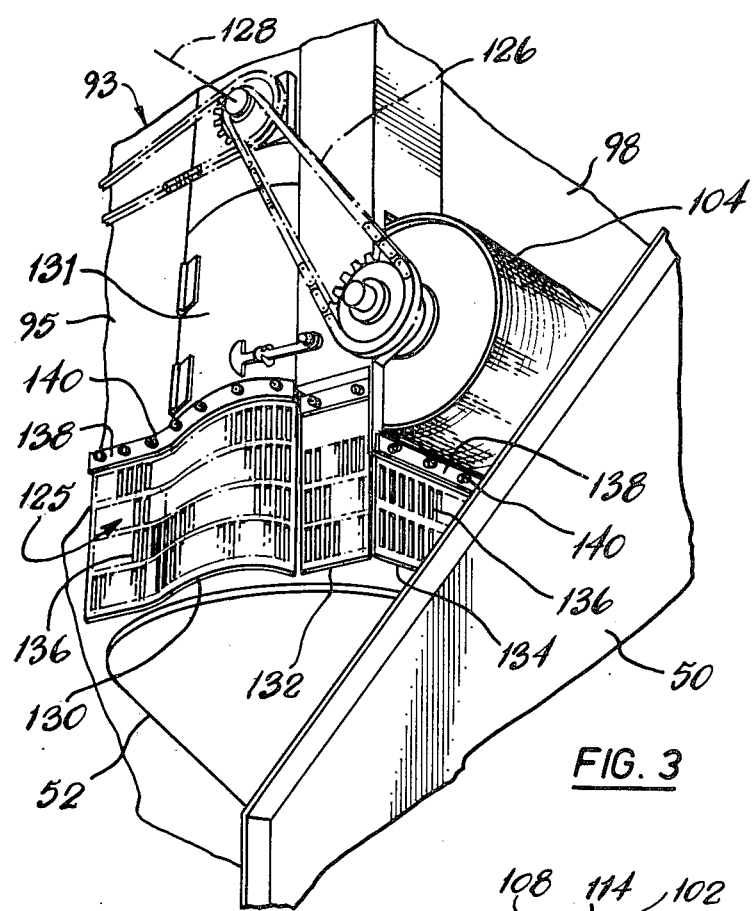
FIG. 3 shows a second embodiment of the invention. This Figure shows a perspective view from the rear left hand side of a portion of a harvester, similar to that of FIG. 1.

As shown in FIG. 1 a self propelled harvester 10 for sugar cane or similar crops such as bamboo comprises:
 a main body including an operator's cab 12 and a diesel engine at 14, the body being mounted on steerable front wheels 15 and driven rear traction wheels 16;
 a top cutting unit 18 for severing the tops from the sticks of standing cane, the unit being mounted on a parallelogram type boom 20 so as to be adjustable in height between the positions identified as P1 and P2. The top cutting unit 18 is fully disclosed in U.S. Pat. No. 4,008,557 to Ruback et al.;
 crop gathering means including a pair of laterally spaced upstanding walls 22 defining a throat and each surmounted by one of a pair of rotatable stick lifting spirals 24;
 base cutting means consisting of a pair of contra-rotating in-running base cutters 26 each having a disc carrying projecting blades, the base cutters being positioned to sever cane sticks from their roots as they pass through the throat defined by walls 22;
 stick feeding means comprising an assembly of power-rotated paddle-type rollers 28, 30, 32, 34, 36, 38, 40 and 42 of differing sizes. These rollers may be constructed in several different ways. In most cane growing areas rollers with a shaft and a plurality of radially extending flat plates or paddles work well. Roller 30 is a butt lifter roller and rollers 38 and 42 are mounted so as to be movable towards and away from rollers 36 and 40 respectively, so as to accommodate varying thicknesses of the layer of cane sticks fed therebetween. An alternate form for the roller 30 is disclosed in U.S. Pat. No. 3,952,482 to Quick;
 stick cutting means to divide or chop the cane sticks into two or more pieces, in the form of a pair of contra-rotatable in-running chopper drums 44, 46 each carrying a pair of projecting blades (not shown) which extend along the full length of each chopper drum. Construction of the chopper drums 44, 46 is disclosed in U.S. Pat. Nos. 4,065,912 to Quick and 3,995,520 to Spargo. The chopper drums are driven in timed relationship so that the blades on the two drums co-operate in pairs to cut the cane sticks passing between them into billets about 30 centimeters in length;
 a power-rotated billet-feeding triangular-section roller 48 to assist the rearward movement of the cascade of cane billets emerging from between chopper drums 44 and 46;
 a pivotally mounted elevator conveyor 50 having a hopper 52 mounted thereon to receive the cane billets, the conveyor being operative to elevate the billets to the discharge end 54 of the conveyor from where they can be dropped into a close-coupled trailer 55 drawn by the harvester. The elevevators normally used on cane harvesters include a pair of chains and slats extending between the chains for conveying cane billets up a stationary surface or floor in the elevator. The pivotal mounting of the elevator conveyor 50 and the integral hopper can take many forms. One possible form is disclosed in U.S. Pat. No. 3,434,271 to Gaunt et al. and primary and secondary sets of trash removal apparatus 56 and 58 respectively, operative to pass air through the billets passing into hopper 52 and through the billets passing from the discharge end 54 of conveyor 50, respectively, so as to cause trash to become entrained with the air. Primary trash removal apparatus 56 is positioned vertically directly above hopper 52.

Elevator conveyor 50 comprises a pair of transversely spaced chains 60 trained round end sprockets 62, 64 and intermediate guide sprockets (not shown) in three mutually inclined upper (billet carrying) runs 66, 68, 70 and three corresponding return runs. A series of transverse slats 72 fastened between the chains serve to carry the billets over a smooth support surface 74 just below the upper runs.

Chains 60 of elevator conveyor 50 and their associated components are mounted on a support structure 76 which is itself mounted on a chassis structure 78 of harvester 10 through pivotally interconnected brackets 80, 82. The brackets permit pivotal movement of the conveyor about a horizontal axis 84 and a vertical axis 86. A hydraulic damping device 87 connected between the conveyor 50 and trash removal apparatus 56 cushions movement of the conveyor about axis 84. A pivotal assembly, such as the one disclosed in U.S. Pat. No. 3,325,982 to Fogels et al. is provided to pivotally attach the forward end of the damping device 87 to the duct 92.

Hopper 52 is carried by support structure 76, is generally frusto-conical in shape with an open side and is located above run 66 of the conveyor 50 so that billets falling into the hopper are engaged by the slats 72 and conveyed upwards and rearwards out of the hopper.

Secondary trash removal apparatus 58 comprises a hydraulically-driven axial flow fan 88 rotated about a vertical axis in a generally cylindrical housing 90 through which the cane billets fall from the discharge end 54 of elevator 50. The run 66 of the conveyor forms a bottom for the hopper 52. The lower portion of the run 68 closes the side of the hopper 52. The fan produces an upwardly moving air current through the cascade of cane billets.

Primary trash removal apparatus 56 comprises a vertically-disposed open-ended cylindrical duct 92 which opens downwards into a housing 93 defined by two transversely spaced vertical side walls 94, 95 (see FIG. 2) a top wall 96 and a rear wall 98. A belt-driven axial flow fan 100 is mounted at the lower end of duct 92 to draw air through housing 93 and to pass the air through duct 92.

Structure defining air intake means for primary trash removal apparatus 56 at the lower rear end of housing 93 comprises a primary air intake 101 formed by a deflectible air-permeable curtain 102 comprising a series of hanging chains, together with a further air intake 103 formed by a rotatable air permeable member in the form of a roller 104.

Roller 104 is in the form of a cylinder or drum of wire mesh positioned between air intake 101 and fan 100, and is slowly rotated in the direction indicated, by a chain drive (not shown). The lower edge of rear wall 98 of housing 93 is formed into an aerodynamically shaped rolled lobe 106 to co-operate with roller 104.

Figure 2:
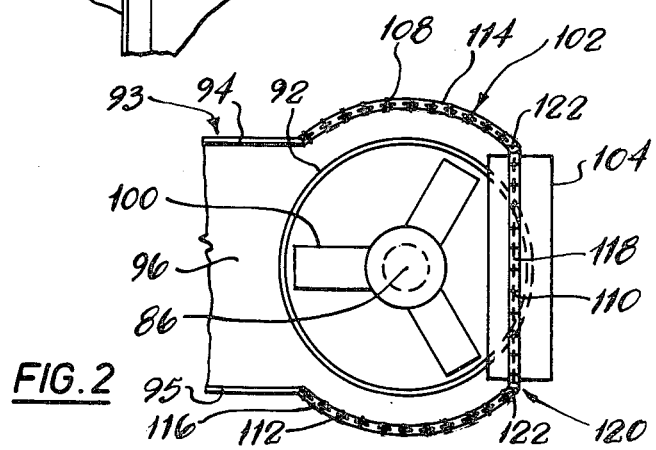
FIG. 2 shows diagrammatically a section on the line II—II in FIG. 1 through an air intake forming part of the trash removal apparatus.
Figure 4:
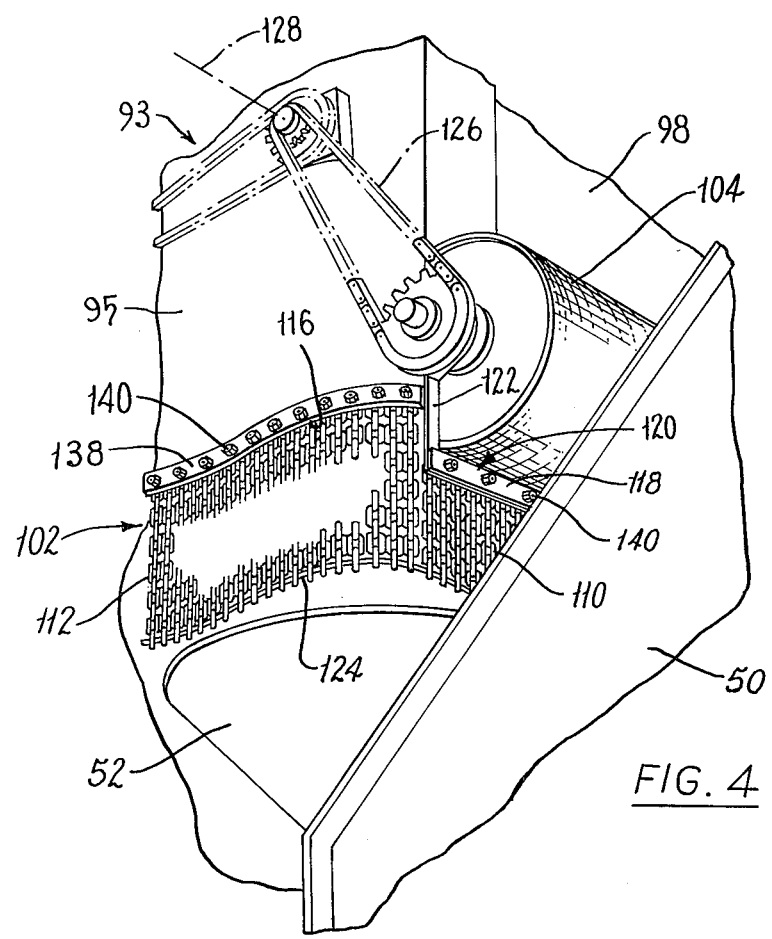
FIG. 4 shows a perspective view from the rear left hand side of a portion of the harvester of FIG. 1.

The chains forming curtain 102 of the primary air intake 101 are of the "anchor" type. That is to say, they comprise interlinked closed steel loops. The chains are arranged in close side by side relationship so as to form three curtain portions 108, 110, 112 arranged in a generally U-shaped configuration as seen in FIG. 2.

Curtain portions 108 and 112 are suspended from the lower edges of convex portions 114, 116 of side walls 94, 95. Curtain portion 110 is suspended from the horizontal limb 118 of a generally U-shaped bracket 120 the vertical limbs 122 of which are secured to side walls 94, 95. Bracket 120 is proportioned so as to fit round and below air inlet roller 104.

The lower end of each hanging chain of curtain 102 is fastened to a generally U-shaped steel bar 124 constituting a weight member to hold down the chains. Bar 124 is shaped so as to correspond to the configuration of the upper edge of hopper 52 and for this purpose the two side limbs of the U-shape are curved outwards like wall portions 114, 116 above it, the curvature being centred on axis 86. The rear limb of the bar is straight.

In use, chopper drums 44, 46 chop the cane sticks into billets about 30 centimeters in length. The billets cascade over billet feeding roller 48, through housing 93 and are guided by curtain 102 into hopper 52. From the hopper the billets are elevated by conveyor 50 and dropped into trailer 55. Trash removal apparatus 56 removes trash from the billets as they fall into hopper 52 and trash removal apparatus 58 completes this cleaning work as the billets fall from the upper end 54 of conveyor 50.

Fan 100 of primary trash removal apparatus 56 draws air into housing 93 through roller 104 and through curtain 102. The position of these two air inlets is such that as the air enters housing 93 it passes directly through the cascade of billets and entrains cane leaves and other trash. The trash is discharged vertically through duct 92 in the air flow produced by fan 100.

When cane leaves or other trash are drawn by the inward air flow onto roller 104, the roller intercepts and stops the trash and then the rotation of the roller carries the trash into housing 93 whereupon the air flow sucks the trash off the roller and the trash is discharged vertically.

In the case of cane leaves or other trash being drawn onto curtain 102, the curtain which is of course highly air permeable intercepts and stops the trash. When the cane harvester is stopped, the trash falls off.

During harvesting, the harvester and its trailer may have to cross extremely uneven ground, such as where drainage channels have been provided. At such times considerable relative motion occurs between the harvester and its close-coupled trailer 55, which may cause elevator 50 to contact the front of the trailer and to pivot forwards about axis 84.

Such movement of the conveyor causes hopper 52 to engage curtain 102 and deflect it. As soon as the conveyor moves rearward, the curtain returns to its normal position. The movement of the elevator about axis 84 is cushioned by damping device 87.

Furthermore, the curtain deflects or yields bodily when a large body of cane is carried out of hopper 52 after the hopper has been used as a temporary storage zone for cane billets, as mentioned previously.

Advantages provided by the embodiment described above include the following. Firstly, curtain 102 is both flexible and air permeable and can therefore both bodily yield when necessary, and admit air to trash removal apparatus 56 at the high rate demanded by fan 100. Secondly the structure of the curtain arising from the use of chains therefor is such that air enters the trash removal apparatus in a more appropriate direction. The use of louvres hitherto has imposed a large change of direction upon the air flow as it enters the trash removal zone which interferes somewhat with the desired smooth air flow through the trash removal apparatus. Thirdly the curtain excludes all but very small particles of trash from entering the apparatus and being recycled.

In the embodiment of FIG. 3, the chains of curtain 102 of the preceding embodiment are replaced by a curtain 125 comprising sheets of perforated flexible sheet material, but other parts of the cane harvester are similar to those of the preceding embodiment and are identified by the reference numerals used previously.

FIG. 3 also shows the chain drive 126 for air inlet roller 104, which also serves to drive a roller (not shown) mounted within the housing 93 of the trash removal apparatus for rotation about a transverse axis 128. This latter roller serves to deflect trash around the support arm (not shown) of the fan of the trash removal apparatus. Housing 93 has an inspection hatch 131.

Curtain 125 comprises separate side portions 130, 132 (and corresponding portions at the other side of the harvester) and a rear portion 134 which conform to the configuration of housing 93 and overlie the upper edge of hopper 52.

Each curtain portion is formed from rubber conveyor belting reinforced by 3 plies of textile material. The belting is 0.64 centimeters in thickness and has rows of rectangular slots 136 punched therein, each slot being 3.08 centimeters in height and 0.95 centimeters in width. The curtain portions are clamped to housing 93 at their upper edges by apertured metal strips 138 and a series of nut and bolt assemblies 140.

In use, curtain 125 functions in a similar manner to curtain 102 of the first embodiment. However it should be noted that since the curtain is formed in separate portions 130, 132, 134 which are not joined to each other along their edges, these portions can be independently deflected outwards when a large mass of cane is conveyed out of hopper 52 after a period of billet storage therein. Thus the curtain is easily able to accommodate such overload conditions regardless of whether elevator conveyor 50 is positioned for rear delivery (when opening up the first row in a field of cane) or when subsequently the conveyor is positioned for side delivery.

Among modifications within the scope of the invention which could be introduced into the embodiments described above, are the following:

1. the use, in place of the chains and slotted rubber sheets in the air intakes, of a sheet or sheets of relatively inflexible material pivotally mounted on the trash removal apparatus so as to be deflectible. For example sheets of expanded metal or perforated metal could be used. As regards the shape and size of the perforations, these must be such as to permit sufficient air inflow while preventing the escape of billets.

2. the use of weight members fastened to the lower edges of the curtain 125 of rubber sheet material.

I claim:

1. A harvester for sugar cane or similar crops comprising:
    a frame; supported on ground engaging means;
    stick cutting means operative to cut harvested crop sticks into two or more pieces mounted on the frame;
    trash removal apparatus mounted on the frame operative to pass air through said stick pieces produced by the stick cutting means and to cause trash to become entrained with the air;
    structure defining an air intake for said trash removal apparatus;
    a conveyor mounted on the frame for pivotal movement about an upwardly extending axis and about a horizontal axis with a lower end located adjacent to and below said air intake to receive said stick pieces from the trash removal apparatus; and
    a hopper mounted on the lower end portion of the conveyor for receiving said stick pieces and guiding them toward the conveyor;
    characterized in that said structure defining an air intake comprises a deflectible air-permeable curtain positioned to guide said stick pieces into said hopper and towards the conveyor.

2. A harvester according to claim 1 characterized in that said curtain is of flexible material.

3. A harvester according to claim 2 characterized in that said curtain comprises a piece of perforated flexible sheet material.

4. A harvester according to claim 3 characterized in that the flexible sheet material comprises rubber sheet material.

5. A harvester according to claim 3 characterized in that the perforations in said flexible sheet material are in the form of slots.

6. A harvester according to claim 3 characterized by a weight member fastened to the lower end of said flexible sheet material.

7. A harvester according to claim 2, characterized in that said curtain comprises a series of hanging chains.

8. A harvester according to claim 7 characterized by a weight member fastened to the lower ends of said chains.

9. A harvester according to claim 1 characterized by a hopper mounted over a portion of said conveyor to receive said stick pieces and to guide them towards said conveyor, said curtain being positioned to guide said stick pieces into the hopper.

10. A harvester according to claim 9 characterized in that said curtain comprises separate portions secured to the trash removal apparatus at their upper edges and arranged in a generally U-shaped configuration so as to correspond to the configuration of said hopper.

11. A harvester according to claim 9 characterized in that said conveyor is in the form of an elevator having at least two mutually inclined runs, said hopper being mounted above the first of said runs and being positioned vertically directly below said trash removal apparatus.

12. A harvester according to claim 1 characterized by a rotatable air-permeable drum mounted between said air intake and the trash removal apparatus and constituting a further air intake for the trash removal apparatus.

* * * * *